United States Patent
Jagota et al.

(10) Patent No.: US 7,700,173 B2
(45) Date of Patent: Apr. 20, 2010

(54) FIBRILLAR MICROSTRUCTURE FOR CONFORMAL CONTACT AND ADHESION

(75) Inventors: Anand Jagota, Bethlehem, PA (US); Stephen J. Bennison, Wilmington, DE (US)

(73) Assignee: E.I. du Pont de Nemours and Company, Wilmington, DE (US)

(*) Notice: Subject to any disclaimer, the term of this patent is extended or adjusted under 35 U.S.C. 154(b) by 215 days.

(21) Appl. No.: 11/937,717

(22) Filed: Nov. 9, 2007

(65) Prior Publication Data

US 2008/0113147 A1 May 15, 2008

Related U.S. Application Data

(62) Division of application No. 10/447,931, filed on May 29, 2003, now Pat. No. 7,294,397.

(60) Provisional application No. 60/383,814, filed on May 29, 2002.

(51) Int. Cl.
*B32B 33/00* (2006.01)
(52) U.S. Cl. ............... 428/40.1; 428/343; 428/354; 428/357
(58) Field of Classification Search ............... 428/92, 428/97, 40.1, 343, 354, 102, 105, 114, 357, 428/364, 401, 107
See application file for complete search history.

(56) References Cited

U.S. PATENT DOCUMENTS

| | | | |
|---|---|---|---|
| 6,054,007 A | 4/2000 | Boyd | |
| 6,123,890 A | 9/2000 | Mazurek | |
| 6,737,160 B1 | 5/2004 | Full et al. | |
| 6,872,439 B2 | 3/2005 | Fearing et al. | |
| 7,011,723 B2 | 3/2006 | Full | |
| 7,229,685 B2 * | 6/2007 | Full et al. | 428/343 |
| 7,294,397 B2 * | 11/2007 | Jagota et al. | 428/357 |
| 7,479,318 B2 * | 1/2009 | Jagota et al. | 428/92 |
| 2001/0003872 A1 | 6/2001 | Pederson | |
| 2003/0124312 A1 | 7/2003 | Autumn | |
| 2004/0005454 A1 | 1/2004 | Full et al. | |
| 2004/0071870 A1 | 4/2004 | Knowles et al. | |
| 2004/0076822 A1 * | 4/2004 | Jagota et al. | 428/364 |
| 2005/0072509 A1 | 4/2005 | Full | |
| 2005/0151385 A1 | 7/2005 | Autumn | |
| 2005/0163997 A1 * | 7/2005 | Van Trump et al. | 428/375 |
| 2006/0078725 A1 | 4/2006 | Fearing | |
| 2008/0113147 A1 * | 5/2008 | Jagota et al. | 428/97 |

FOREIGN PATENT DOCUMENTS

| | | |
|---|---|---|
| EP | 0 353 907 B1 | 2/1990 |
| EP | 1142702 | 10/2001 |
| JP | 07-109443 | 4/1995 |
| WO | WO 91/15365 A1 | 10/1991 |

(Continued)

OTHER PUBLICATIONS

Wolf-Deitrich Dellit, Anatomy and Physiology of the Gecko Toe, Jeanaische Zeitschrift, vol. LXVIII, pp. 613-656, 1935.

(Continued)

*Primary Examiner*—N. Edwards

(57) ABSTRACT

Disclosed herein is a dry, re-applicable, fibrillar adhesive apparatus.

29 Claims, 12 Drawing Sheets

FOREIGN PATENT DOCUMENTS

| WO | WO 94/00525 | | 1/1994 |
|---|---|---|---|
| WO | WO 97/18276 | A1 | 5/1997 |
| WO | WO 97/23249 | A1 | 7/1997 |
| WO | WO 98/45382 | | 10/1998 |
| WO | WO 02/43937 | A3 | 6/2000 |
| WO | WO 00/39829 | | 7/2000 |
| WO | WO 00/69985 | | 11/2000 |
| WO | WO 01/49776 | | 7/2001 |
| WO | WO 02/074877 | A2 | 9/2002 |
| WO | WO 2004/033190 | A2 | 4/2004 |
| WO | WO 2005/024100 | A2 | 3/2005 |
| WO | WO 2005/026042 | A1 | 3/2005 |
| WO | WO 2006/060149 | | 6/2006 |
| WO | WO 2006/094025 | | 9/2006 |

OTHER PUBLICATIONS

Rodolfo Ruibal et al., The Structure of the Digital Setae of Lizards, J. Morph., vol. 117:271-294; 1965.

N.E. Stork, The Adherence of Beetle Tarsal Setae to Glass, Journal of Natural History, vol. 17:583-597, 1983.

V. B. Wigglesworth, How Does a Fly Cling to the Under Surface of a Glass Sheet? J. Exp. Biol., vol. 129:373-376, 1987.

R. B. Aiken et al., The Adhesive Strength of the Palettes of Males of a Boreal Water Beetle, Dytiscus Alaskanus J. Balfour Browne (Coleoptera: Dytiscidea), Can. J. Zool., vol. 70:1321-1324, 1992.

Duncan J. Irschick et al., A Comparative Analysis of Clinging Ability Among Pad-Bearing Lizards, Biological Journal of the Linnean Society, vol. 59:21-35, 1996.

John F. Hagewood, Polymeric Nanofibers: Fantasy or Future?, Fiber Engineering, vol. 17:62-63, 2002.

Senta Niederegger et al., Contact Behaviour of Tenent Setae in Attachment Pads of the Blowfly (Calliphora Vicina (Diptera, Calliphoridaes)), J. Comp. Physiol A., vol. 187:961-970, 2002.

Eduard Artz et al., Towards A Micromechanical Understanding of Biological Surface Devices, Z. Metallkd., vol. 93:345-351, 2002.

A.K. Geim et al., Microfabricated Adhesive Mimicking Gecko Foot-Hair, Nature, pp. 1-3, 2003.

"Caught on Tape", Science News, vol. 163, p. 356, Jun. 2003.

\* cited by examiner

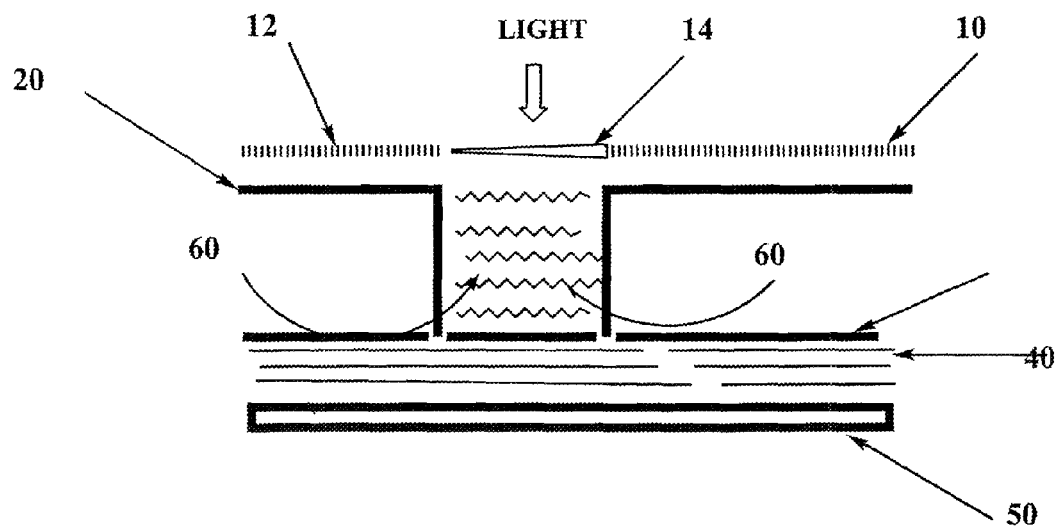
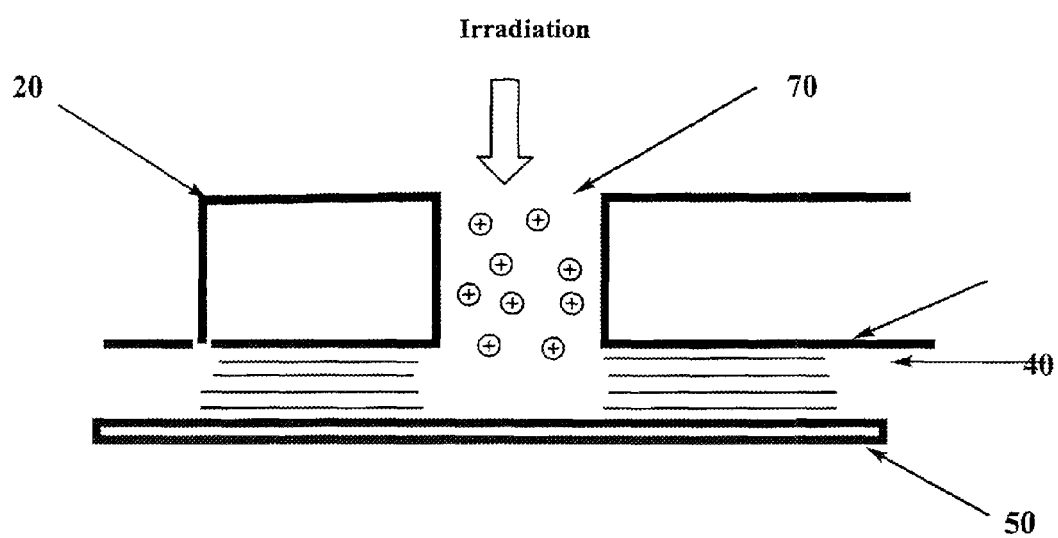

FIGURE 6
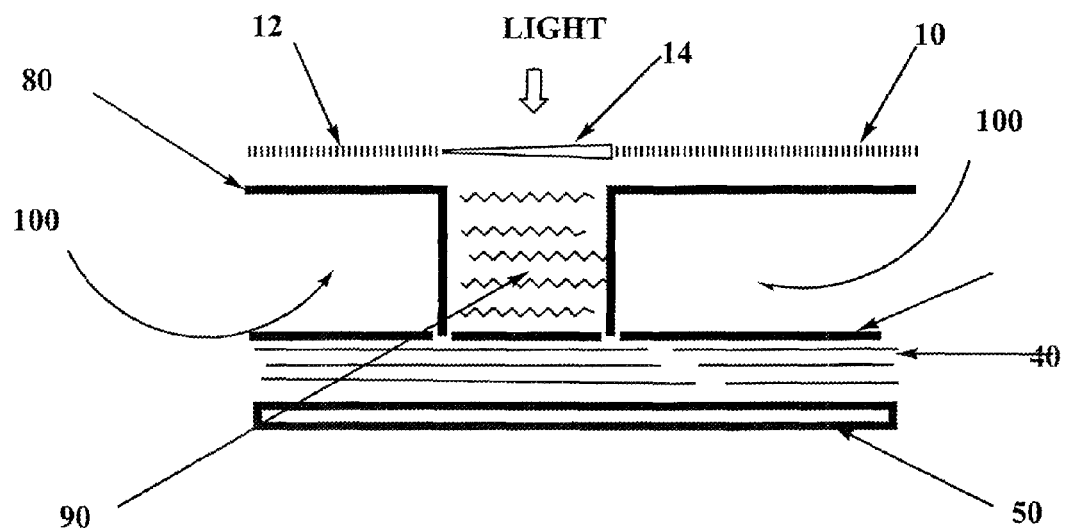
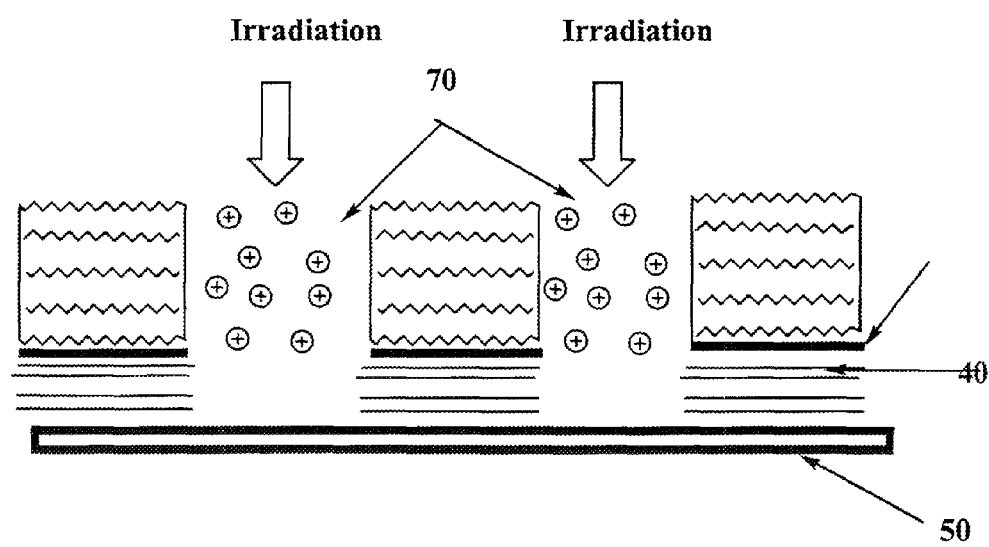

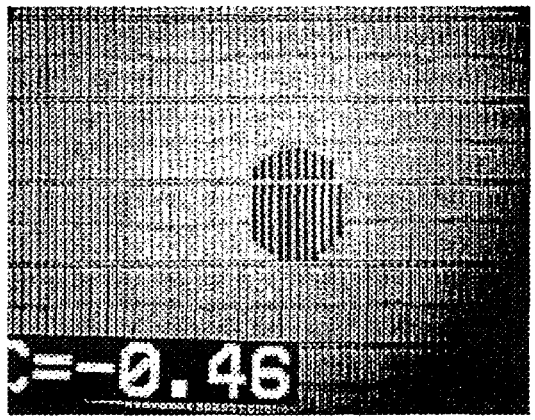 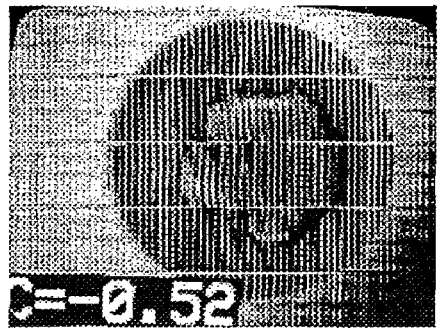
Contact established      Critical load at buckling
(a)      (b)
Figure 10

(a) (b)

FIBRILLAR MICROSTRUCTURE FOR CONFORMAL CONTACT AND ADHESION

This application is a division of application Ser. No. 10/447,931, filed May 29, 2003 (which is incorporated in its entirety as a part hereof for all purposes), which claimed the benefit of U.S. Provisional Application No. 60/383,814, filed May 29, 2002.

This application claims the benefit of U.S. Provisional Application No. 60/383,814, filed on May 29, 2002, which is incorporated in its entirety as a part hereof for all purposes.

BACKGROUND OF THE INVENTION

This invention involves a dry, re-applicable adhesive apparatus.

Adhesives are widely used substances that ideally have a regulated amount of strength—adequate to the task and yet not so great that the adhesive itself cannot be broken or removed, or not so great that an adhered article cannot be moved and re-adhered. If an adhesive is to be used repeatedly, it should not have a strong (e.g., covalent) bond to the surface to which it adheres. This requirement removes an entire class of solutions. If the adhesive is to be a dry, non-liquid system, it is restricted to two types of known systems: (a) pressure-sensitive adhesives, or (b) interlocking type systems. Systems of type (a), pressure sensitive adhesives, fail because they rely upon very soft materials. These materials pick up dirt very easily, and are subject to long-term creep. The adhesion is also strongly dependent on rate of loading. Systems of type (b) require two mating surfaces and require the use of relatively large fibrils.

Many organisms have evolved a fibrillated interface for controlled contact and adhesion. As discussed in WO 01/49776, for example, the Gecko, appears to have evolved the ability to create dry, re-applicable adhesion to a variety of surfaces by relying only on weak van der Waals forces. Despite the low intrinsic energy of separating surfaces held together by van der Waals forces, these organisms are able to achieve remarkably strong adhesion. The microstructure employed by the Gecko, consisting of fibrils called setae and spatulae, plays a critical role in this ability.

Although the use of a fibrillar mat to mediate contact and adhesion is not limited to the example of the Gecko, quantitative relationships between parameters of a fibrillar structure and resulting contact and adhesion behavior have not been established. There remains a need to provide a synthetic fibrillar microstructure in which microstructural parameters are used to control contact and adhesion as the microstructure is applied against a surface and then pulled away.

It has been found that a fibrillar microstructure in which fibrils have a geometric properties such as length, width and aspect ratio, and have materials properties such as stiffness, adhesive energy and adhesive strength, as described herein, provides an apparatus having good conformal contact and adhesion at the interface thereof with a surface.

SUMMARY OF THE INVENTION

One embodiment of this invention is an apparatus that adheres to a surface and includes (a) a substrate, and (b) a plurality of fibrils attached to the substrate, wherein one or more of the fibrils (c) are characterized by a value of P in Equation III in the range of about $10^2$ to about $10^6$, and (d) has a neutral axis, passing through the centroid of the cross-sectional area of the fibril, that has an orientation with the plane of the substrate, at the point of intersection of the axis with the plane of the substrate, in the range of greater than 75° to about 90°;

wherein Equation III is $$P=c*E*(a/L)^2, \text{ and}$$

wherein E is the Young's modulus of the material of the fibril as determined by ASTM D412-87, a is one-half of the characteristic width of the fibril, L is the length of the fibril, c is a dimensionless constant having a value in the range of about 0.1 to about 1.0, and * indicates multiplication.

Another embodiment of this invention is an apparatus that adheres to a surface and includes (a) a substrate, and (b) a plurality of fibrils attached to the substrate, wherein the minimum distance between the surface of a first fibril and the surface of a second adjacent fibril, at the plane of attachment of the fibrils to the substrate, is a distance 2w where w is determined from Equation IV;

wherein each of the first and second fibrils has a neutral axis, passing through the centroid of the cross-sectional area of the fibril, that has an orientation with the plane of the substrate, at the point of intersection of the axis with the plane of the substrate, in the range of greater than 75° to about 90°;

wherein Equation IV is $$w>(g^2*L^2/4a)*(2\gamma/3Ea)^{1/2}; \text{ and}$$

wherein E is the Young's modulus of the material of the first or second fibril as determined by ASTM D412-87, a is one-half of the characteristic width of the first or second fibril, L is the length of the first or second fibril, $\gamma$ is the surface energy of the material of the first or second fibril as determined by ASTM D724-99, g is a dimensionless constant having a value in the range of about 0.05 to about 5.0, and * indicates multiplication.

A further embodiment of this invention is an apparatus that adheres to a surface and includes (a) a substrate, and (b) a plurality of fibrils attached to the substrate, wherein one or more of the fibrils (c) are characterized by a value of a, one-half of the characteristic width of the fibril, determined from Equation VI, and (d) has a neutral axis, passing through the centroid of the cross-sectional area of the fibril, that has an orientation with the plane of the substrate, at the point of intersection of the axis with the plane of the substrate, in the range of greater than 75° to about 90°;

wherein Equation VI is $$a<d*\Gamma_0*E/s^2,$$

wherein E is the Young's modulus of the material of the fibril as determined by ASTM D412-87, $\Gamma_0$ is interfacial fracture energy of the of the material of the fibril as determined by ASTM D3433-99, is the interfacial strength of the material of the fibril as determined by ASTM D2094-69, d is a dimensionless constant having a value in the range of about 0.05 to about 5.0, and * indicates multiplication.

Yet another embodiment of this invention is an apparatus that adheres to a surface and includes (a) a substrate, and (b) a plurality of fibrils attached to the substrate, wherein one or more of the fibrils (c) adheres to the surface with a work of adhesion of $\Gamma$ in the range of about 0.1 J/m² to about $10^4$ J/m², where $\Gamma$ is determined according to Equation VII, and (d) has a neutral axis, passing through the centroid of the cross-sectional area of the fibril, that has an orientation with the plane of the substrate, at the point of intersection of the axis with the plane of the substrate, in the range of greater than 75° to about 90°;

wherein Equation VII is $$\Gamma=\Gamma_0+f*s^2*L/2E;$$

wherein $\Gamma_0$ is interfacial fracture energy of the of the material of the fibril as determined by ASTM D3433-99, s is the interfacial strength of the material of the fibril as determined by ASTM D2094-69, E is the Young's modulus of the material of the fibril as determined by ASTM D412-87, L is the length of the fibril, f is a dimensionless constant having a value in the range of about 0.01 to about 5.0, and * indicates multiplication.

An adhesive apparatus as described above has the advantage of enabling a fibrillar interface to simultaneously provide a desirable amount of both universal contact with a surface as well as adhesion thereto. Without being restricted to any theory, the apparatus appears to experience buckling of fibrils, and, as such, it operates as a carpet of fibrils with the behavior of a plastic solid under compressive loading, and allows intimate contact between fibrils and surface in the presence of some roughness. In the performance of the apparatus as an adhesive, energy in the fibrils appears to be lost upon decohesion and unloading, a mechanism that can add considerably to the intrinsic work of fracture, and result in good adhesion even with only van der Waals forces.

BRIEF DESCRIPTION OF THE DRAWINGS

FIG. 5 shows a layout for use of a negative photoresist.

FIG. 6 shows a layout for use of a positive photoresist.

FIG. 10 illustrates Example 4.

DESCRIPTION OF PREFERRED
EMBODIMENTS OF THE INVENTION

This invention involves an adhesive apparatus characterized by a fibrillar microstructure. In preferred embodiments, the fibrils are made from synthetic materials. The gross shape or form that the fibrils take on may be selected from a variety of shapes such as that of a tube, rod, cylinder, plate, or cone. The fibrils may be solid or hollow, or contain a channel. The fibrils may have a variety of cross-sectional shapes such as circular, rectangular, elliptical, angled, or channeled. Additionally, the shape of the cross section may be characterized by a perimeter made up of a series of arcs of different radius, or a series of such arcs with straight line segments interspersed. The shape and area of the cross section of the fibrils may or may not be constant along the length of the fibril.

The surface to which the apparatus of this invention adheres is typically non-fibrillar.

A pre-requisite for appreciable adhesion (especially if only van der Waals forces are invoked) is that uniform and intimate contact be established between the adhesive and the surface to which it is to adhere. Indeed, it is well known that the adhesion between solids is generally low because surface non-planarity limits the actual contact area between the solids to be a small fraction of the total surface area. By contrast, a softer material permits conformal contact to be achieved more easily with a surface. This advantage of a softer material is obtained at the cost of other factors, however. For one, the surface of a material that has a low modulus is more susceptible to adhesion by particulates.

A fibrillar structure offers the opportunity of working around these conflicting requirements of conformal contact without gratuitous particulate adhesion. This is very useful because particle adhesion fouls the surface of the adhesive and reduces the opportunity for multiple use. A fibrillar structure offers this advantage because, in compression, each fibril buckles easily. Upon initial loading, it behaves elastically; post-buckling the fibril carries no extra load for incremental loading, thereby transferring any new load to unloaded fibers.

Figure 1:
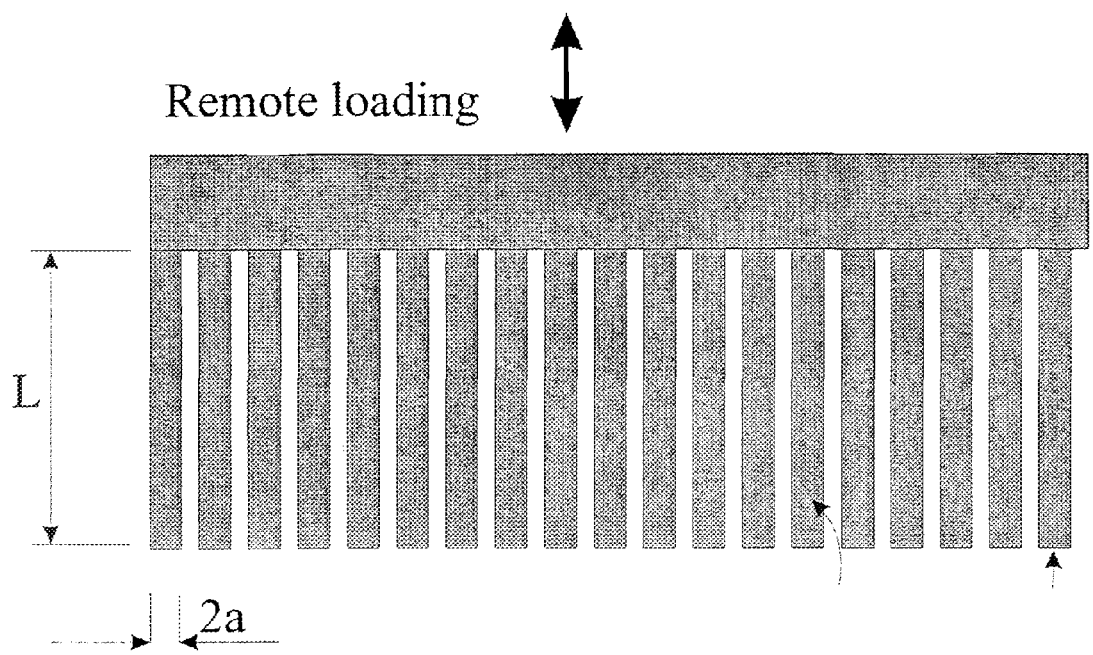
FIG. 1 shows a side elevation of fibrils in an apparatus of this invention.

A set of fibrils that are receiving a load are shown in FIG. 1, in which each fibril has a characteristic width of 2a, and a length ("L"). The characteristic width of a fibril is defined as four times the minimum value of the radius of gyration of the fibril cross-sectional area about its centroid. Methods for determining a minimum value of a radius of gyration about its centroid are known in the art from sources such as *Roark's Formulas for Stress and Strain*, Sixth Edition, Chapter 5, Warren C. Young, McGraw-Hill, 1989 (which is incorporated as a part hereof for all purposes). The length of a fibril is measured from the free end of the fibril to the plane of its attachment to a substrate The fibrils as shown in FIG. 1 may experience buckling, and the occurrence of this phenomenon is drawn schematically in FIG. 2. As a fibrillar interface is pushed against an undulating surface, first contact is made against the higher regions of the surface, which is where the load is transmitted across the interface. With increasing load, the fibers buckle at the high points. Post-buckling, these continue to carry only the buckling load, thus transferring the remaining load to other fibers. Eventually, when all fibrils have buckled, to first order, the interface transmits uniform load despite its uneven profile. This can help accomplish uniform contact without sacrificing the elastic modulus of the material. The fibrillar nature of the material may also obviate problems associated with formation of trapped bubbles by allowing for flow of air.

When stress is released, after the interface has been compressed into contact, the stress across the interface will typically average to zero. In high regions of the substrate, the fibrils will be buckled—the stress being limited by the buckling condition. This will be compensated elsewhere by fibrils in tension. For conformal contact to be maintained everywhere, fibrils in tension should not be strained so much that they decohere. If some do decohere, conformality of contact will not be perfect and some of the fibrils in compression will go into tension to ensure that the integrated interfacial stress is zero.

Figure 3:
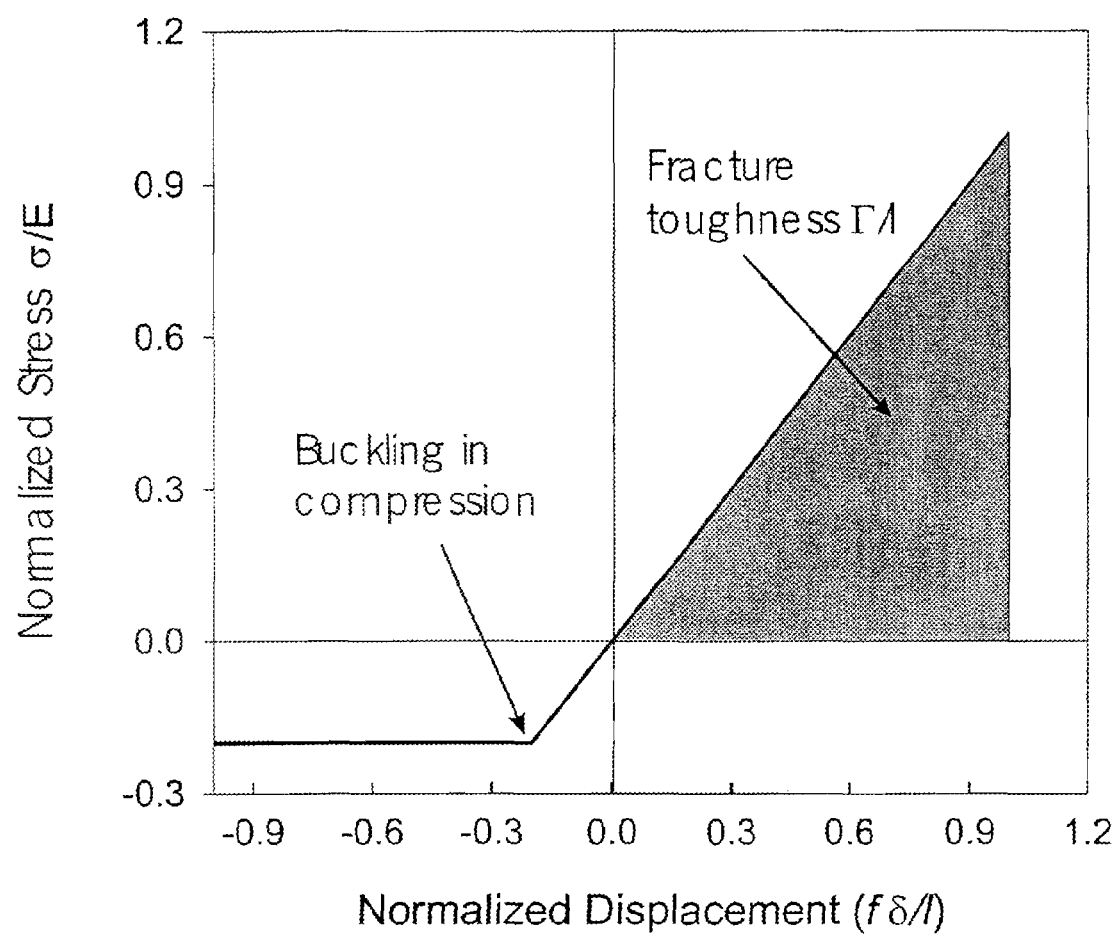
FIG. 3 is a graph of normalized stress vs. normalized displacement.

For small departures from the unloaded state, the stress-strain response of a mat of fibrils is given simply by $$\frac{\sigma}{E} = f \frac{\delta}{L}. \tag{I}$$

where f is the area-fraction of fibrils, and $\delta$ is their deflection, as shown in FIG. 3. The precise buckling stress under compression depends on the support conditions for each fibril at the two ends. For simply-supported (fixed displacement, free to rotate) conditions at both ends, the buckling stress is given by $$\frac{\sigma}{E} = f \frac{\pi^2}{3} \left(\frac{a}{L}\right)^2. \quad \text{(II)}$$

When it is desired that fibrils make uniform contact with a surface as a result of the application of a given stress, the selection of that amount of stress yields a range of acceptable values for the ratio of a/L of the fibril in view of the Young's modulus of the material of the fibril. Soft materials having a low modulus are of course able to easily make conformal contact to fairly rough surfaces. By appropriate selection of modulus and aspect ratio, however, a much stiffer material could also be used to conform in compression to a rough surface while retaining a modulus high enough to discourage adhesion of particles. This is useful because the adhesion of particles leads to fouling.

A mat of fibrils behaves like a plastic material in that it appears to yield/flow at constant stress under compression, as shown in FIG. 3. The deformation is reversible, however, because on reversing the loading, it would retract back through the origin. It should therefore be noted that the buckling condition requires only an appropriate aspect ratio, a/L, and does not prescribe absolute values for these quantities.

In the apparatus of this invention, an appropriate range of values of a/L in view of the Young's modulus of the material of the fibril is indicated by the value of P in the range of about $10^2$ to about $10^6$ where P is given by the following equation $$P = c*E*(a/L)^2 \quad \text{III}$$

In Equation III, E is the Young's modulus of the material of the fibril as determined by ASTM D412-87, a is one-half of the characteristic width of the fibril, L is the length of the fibril, c is a dimensionless constant having a value in the range of about 0.1 to about 1.0, and * indicates multiplication.

In a preferred embodiment, P has a value in the range of about $10^2$ to $10^5$.

In the apparatus of this invention, any tendency the fibrils might have to experience lateral adhesion or collapse under the influence of surface forces is reduced or avoided by spacing the fibrils at a selected distance from each other. In a preferred embodiment, the minimum distance between the surface of a first fibril and the surface of a second adjacent fibril, at the plane of attachment of the fibrils to a substrate, may be a distance 2w where w is determined from the following equation $$w > (g^2*L^2/4a)*(2\gamma/3Ea)^2 \quad \text{IV}$$

In Equation IV, E is the Young's modulus of the material of the first fibril as determined by ASTM D412-87, a is one-half of the characteristic width of the first fibril, L is the length of the first fibril, γ is the surface energy of the material of the first fibril as determined by ASTM D724-99, g is a dimensionless constant having a value in the range of about 0.05 to about 5.0, and * indicates multiplication. In other embodiments, the value of w may be calculated from the values of E, a, L and γ for the second fibril; and, where the values for E, a, L and γ are the same for both the first and second fibrils, w may be calculated from the values for either fibril.

In various embodiments of this invention, a first fibril may, for example, be characterized by a spacing in relation to a second fibril as given by a value of 2w in the range of about 4 nanometers to about 50 microns, and preferably in the range of about 50 nanometers to about 50 microns.

Figure 4:
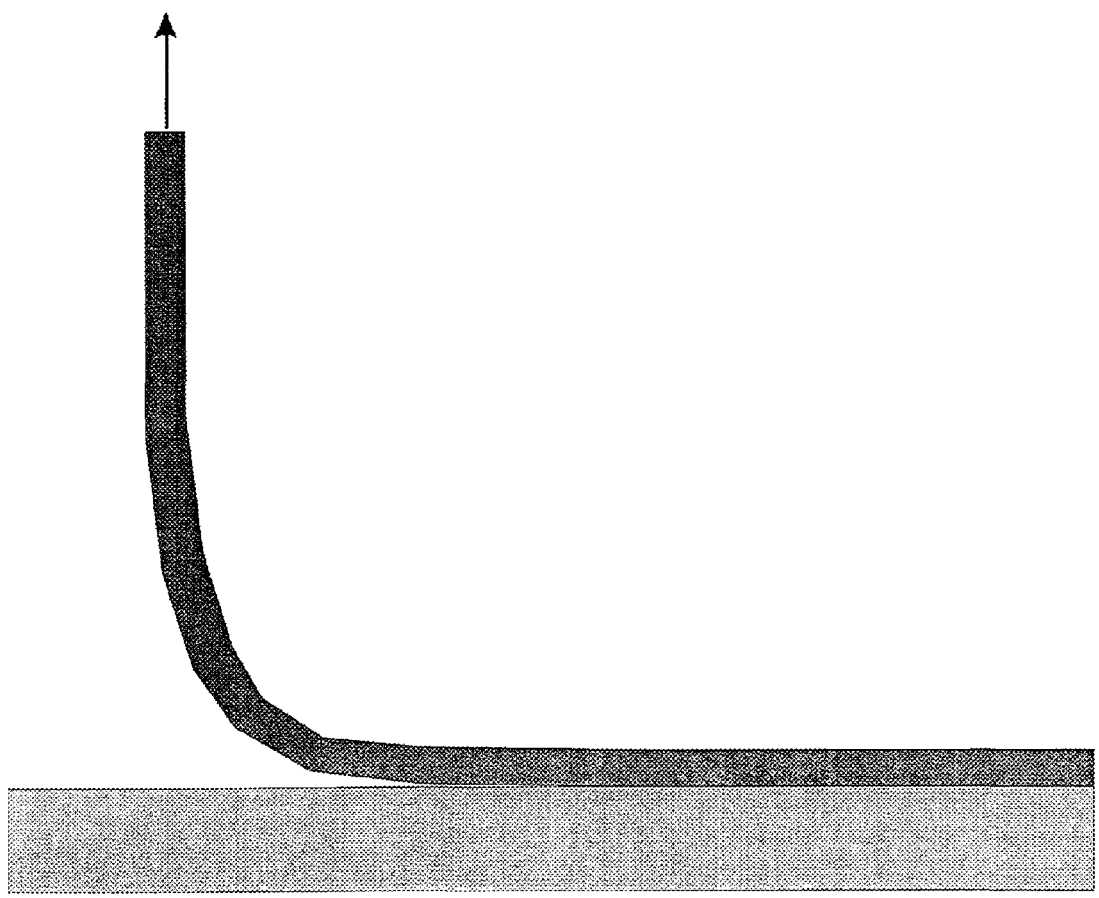
FIG. 4 shows a strip being peeled from a surface.

In this invention, fracture energy is a useful measure of adhesion at large length scales. Consider, for example, an energy balance as the adhesive strip shown in FIG. 4 is peeled from the substrate. Under steady state, the work done by the (unknown) externally applied peeling load goes into the work of adhesion, if the extension of the adhesive is negligible. The peeling force is consequently directly proportional to the fracture energy times the width of the peeled strip.

Figure 2:
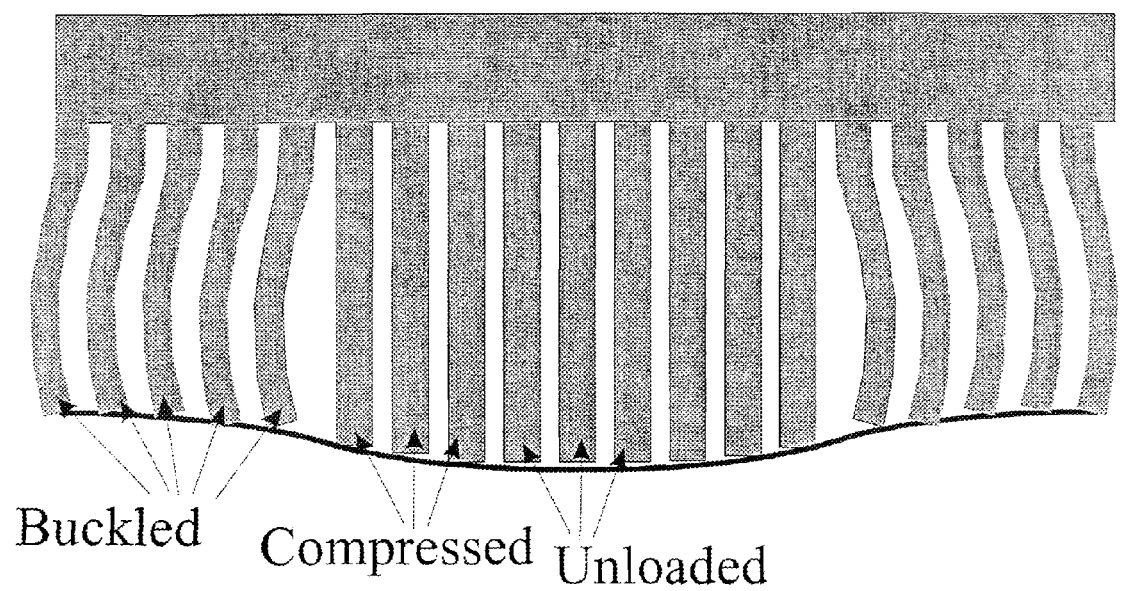
FIG. 2 shows fibrils in a buckled condition.

When, however, the adhesive layer being peeled away is a fibrillated system such as shown in FIG. 2, each fibril, as the peeling process proceeds, is pulled into tension until it decoheres. Without a fibrillar structure, an energy of $\Gamma_0$ per unit area would be lost in this process. The elastic material above the interface would go through a loading-unloading cycle, but the energy would not be dissipated. Rather, it would be released back to the solid further to aid crack advance. In a fibrillar structure, however, the elastic energy stored in the fibril, when released on its decohesion, is apparently no longer released back to the bulk material, but is lost instead. This is consistent with the observation that the spatial path for energy transfer upon unloading has been blocked by the fibrillar structure. Rather than simply transferring energy locally, the energy of the unloaded fibril can be transmitted only via its connection to the bulk at its base, some considerable distance away.

This effect can be seen in Example 1, an experiment with a photoelastic elastomer that illustrates the interaction of a crack with a fibrillar structure. The specimen is loaded vertically in tension and viewed under white light through cross-polarizers. This reveals and visualizes regions of shear strain via the photoelasticity of the material. Growth of the pre-crack to the left initiates in frame (a) of FIG. 7 and advances towards the fibrillar region in frame (b). Each fibril is about 1 mm wide, and the entire fibrillar region is about 20 mm wide. The crack is arrested by the fibrillar region in frame (c). Subsequent advance through this region is much slower, despite the monotonically increasing remote load. In particular, note in frames (d) and (e) how that the unloaded fibrils cannot easily transfer their energy to neighboring regions—that portion of the stored elastic energy is apparently lost. In frame (f), the crack reaches the end of the fibrillar region and again moves much more rapidly.

An estimate of the toughening effect due to energy loss in the fibril can be made by assuming that all the energy in the fibril is lost:

$$\Gamma = \Gamma_o + \frac{f\sigma^{*2}L}{2E}. \quad \text{(V)}$$

Note that the additional energy lost due to the fibrillar structure scales linearly with fibril length and the square of the interfacial strength, which is shown as σ* in Equation V, but is referred to as s in Equations VI and VII.

A further alternative embodiment of this invention is related to this type of energy loss, and may therefore be described as an apparatus wherein one or more of the fibrils has a characteristic width in the amount of 2a, where a is determined by the following equation $$a < d*\Gamma_0*E/s^2 \quad \text{VI}$$

wherein E is the Young's modulus of the material of the fibril as determined by ASTM D412-87, $\Gamma_0$ is interfacial fracture energy of the of the material of the fibril as determined by ASTM D3433-99, s is the interfacial strength of the material of the fibril as determined by ASTM D2094-69, d is a dimensionless constant having a value in the range of about 0.05 to about 5.0, and * indicates multiplication.

The JKR test, as discussed in Example 4, is also a useful measurement to determine $\Gamma_0$.

Another related embodiment is an apparatus that has one or more fibrils that adheres to a surface with a work of adhesion of $\Gamma$ in the range of about 0.1 J/m$^2$ to about 10$^4$ J/m$^2$, where $\Gamma$ is determined according to the following equation $$\Gamma = \Gamma_0 + f^* s^2 * L/2E \quad (VII)$$

In Equation VII, $\Gamma_0$ is the interfacial fracture energy of the material of the fibril as determined by ASTM D3433-99, s is the interfacial strength of the material of the fibril as determined by ASTM D2094-69, E is the Young's modulus of the material of the fibril as determined by ASTM D412-87, L is the length of the fibril, f is a dimensionless constant having a value in the range of about 0.01 to about 5.0, and * indicates multiplication.

In preferred embodiments, $\Gamma$ is in the range of about 0.5 J/m$^2$ to about 1000.0 J/m$^2$.

In various embodiments of the apparatus of this invention, one or more fibrils may be characterized by the properties described above that have values as set forth below:

Suitable values for a, which is one half of the characteristic width of a fibril, may be in the range of about 2 nanometers to about 25 microns, and preferably in the range of about 25 nanometers to about 25 microns.

Suitable values for L may be in the range of about 50 nanometers to about 1000 microns, and preferably in the range of about 100 nanometers to about 1000 microns.

Suitable values for Young's modulus may be in the range of about 10$^5$ to about 2×10$^{12}$ Pa, and preferably in the range of about 10$^5$ to about 2×10$^{10}$ Pa.

Suitable values for $\gamma$ may be in the range of about 0.01 J/m$^2$ to about 2.0 J/m$^2$.

Suitable values for s may be in the range of about 10$^5$ to about 10$^9$ Pa, and preferably in the range of about 10$^5$ to about 10$^8$ Pa.

Suitable values for $\Gamma_0$ may be in the range of about 0.01 J/m$^2$ to about 1000.0 J/m$^2$, and preferably in the range of about 0.05 J/m$^2$ to about 100.0 J/m$^2$.

In the apparatus of this invention, fibrils are attached to a substrate. It is preferred that one or more of such fibrils has a neutral axis, passing through the centroid of the cross-sectional area of the fibril, that has an orientation with the plane of the substrate, at the point of intersection of the axis with the plane of the substrate, in the range of greater than 75° to about 90°. It is more preferred that such orientation of the neutral axis is in the range of about 80° to about 90°, and it is most preferred that it be in the range of about 85° to about 90°. Methods for determination of the orientation of a neutral axis are known in the art from sources such as *An Introduction to the Mechanics of Solids*, R. R. Archer et al, McGraw-Hill (1978), which is incorporated as a part hereof for all purposes.

In various embodiments of this invention, at least about 25 percent of the fibrils of the adhesive apparatus may be characterized by any one or more of the properties as described above; and preferably at least about 50 percent, more preferably at least about 75 percent, and most preferably at least about 90 percent of the fibrils may be characterized by any one or more of the properties as described above.

In the apparatus of this invention, the fibrils may be manufactured from a variety of solid materials. Suitable materials include synthetic materials such as glass, silicon, metals, and carbon nanotubes. Suitable materials also include polymers and copolymers, and blends of two or more of either or both. Exemplary polymers and/or copolymers include polyacetal, polyacetylene, polyacrylamide, polyacrylate, polyacrylic acid, polyacrylonitrile, polyamide, polyaminotriazole, polyaramid, polyarylate, polybenzimidazole, polybutadiene, polybutylene, polycarbonate, polychloroprene, polyesters, polyethers, polyethylenes (including halogenated polyethylenes), polyethylene imine, polyethylene oxide, polyimide, polyisoprene, polymethacrylate, polyoxadiazole, polyphenylene oxide, polyphenylene sulfide, polyphenylene triazole, polypropylene, polypropylene oxide, polysiloxanes (including polydimethyl siloxane), polystyrene, polysulfone, polyurethane, poly(vinyl acetal), poly(vinyl acetate), poly(vinyl alcohol), poly(vinyl butyral), poly(vinyl carbazole), poly(vinyl chloride), poly(vinyl ether), poly(vinyl fluoride), acrylonitrile/butadiene/styrene copolymer, acrylate copolymers (including ethylene/vinyl acetate/glycidyl methacrylate copolymer), styrene/acrylonitrile copolymer.

One method for making the apparatus of this invention is by molding a suitable material into the form of a substrate having fibrils attached thereto. The molding operation utilizes a master mold form prepared by photolithographic means. Using the master mold form, fibrils can be fabricated that have the shapes and sizes, and have the dimensions and other properties, as set forth above.

Lithography is a method for preparation of the master form used to mold the fibrils of the apparatus of this invention. Photolithography is a specific form of lithography where light is used as a degrading force. In a photolithographic method, a photoresist is exposed to electromagnetic radiation, such as ultraviolet light (UV), deep ultraviolet light (DUV), extreme ultraviolet light (EUV) or X-ray. This exposure introduces a latent image on the photoresist, for example, a pattern with difference in solubility. This results from chemical changes in the molecular structure of the resist. The latent image is subsequently developed into relief structures through etching. Electron beam irradiation, or ion-beam irradiation can be used instead of electromagnetic radiation to introduce an image on the photoresist.

The exposure of the photoresist is usually patterned either by interposing a mask between the source of radiation and the material of the photoresist, or by scanning a focused spot of the radiation source across the surface of the material. When masks are used, the lithographic process yields a replica (for example, reduced in size) of the pattern on the mask.

Nanoimprint lithography is a lithographic method employing an imprintable resist in the place of a photoresist. The imprintable resist is typically a polymeric material and is imprinted by an imprinting substrate that applies a pattern to the resist. Alternatively nanoimprint lithography may be practiced using a premolded resist. Premolded resists are liquid polymers that are pored over a substrate in a manner such that a pattern of ridges and valleys are formed. Immersion lithography is a variation of photolithography where an oil (immersion oil) is interposed between the resist and the photomask prior to irradiation. The effect of the immersion oil in this process is to reduce the size of the pattern and permit more cuts by the irradiating source.

A patterning system is any means of creating a suitable pattern for the molding of the apparatus of this invention. In the art of photolithography (including contact, proximity or projection photolithography) a typical patterning system will involve the use of a photomask. In interference lithography a photomask is not used, instead optical interference of two opposed beams of light causes modulation of the light. In immersion lithography, of either the projection or the interference type, the presence of the immersion fluid allows the production of much finer feature patterns in the photoresist, and therefore will permit finer cutting. In other lithography methods, such as nanoimprint lithography or soft lithography, a lithographic mask, master replica or stamp is used.

A lithographic mask or photomask is master mask that defines the pattern of radiation incident on the photoresist. A photomask may include a flexible sheet element having areas which are transparent to radiation incident on the photosensitive layer and complementary areas which are effectively opaque to that radiation; the opaque and transparent area defining the complementary image features to be transferred to the photosensitive layer. Typically the photomask is in a projection lithography stepper, where the projection lens is located between the photomask and the photoresist coated substrate. In the case of proximity or contact lithography, the photomask is proximate to (i.e. sufficiently close so as to be in the line of photons thereby effecting a pattern on the resist) or in contact with the resist layer of the cutting device.

A plasma is an assembly of ions, electrons, neutral atoms and molecules in which particle motion is governed primarily by electromagnetic forces. The term plasma may also refer to a partially ionized gas containing an approximately equal number of positive and negative charges, as well as some other number of non-ionized gas species.

Where typical photoresist technology is used, either a negative or positive resist method may be employed for the cutting process. The negative resist method is illustrated in FIG. 5. As shown in FIG. 5, a photomask (10) is set proximate to a negative resist (20), which in turn is in contact with a mold layer (40). The photomask (10) is comprised of light transmitting (12) and light non-transmitting (14) regions.

The mold layer (40) is positioned on a solid substrate (50). The shape and/or spacing of the light non-transmitting regions of the photomask (14) determine the image created on the photoresist and, ultimately the design of the pattern. The layout of the mask is thus derived from the dimensions desired to be produced in the fibrils of the adhesive apparatus.

The method proceeds when the negative resist is selectively exposed to electromagnetic radiation via a light transmitting section of the photomask (12) and crosslinks the exposed section of the negative resist material (20). Optionally the noncrosslinked material may be removed by the application of a negative resist developer (60), revealing a portion of the mold layer (40).

After removal of the noncrosslinked negative resist, a cutting means (70), (typically irradiation with ions, plasma or electrons), is applied to the exposed mold layer (40) which results in the cutting of the mold layer (40) in the form of a pattern that will enable molding of an apparatus of this invention containing fibrils in the desired size and shape.

In another embodiment, this method makes use of a positive resist as opposed to a negative resist. Referring to FIG. 6, the method proceeds essentially as with the negative resist method except a positive resist layer (80) is included in the place of the negative resist. Exposure of the photomask (10) to light results in degradation of the positive photoresist material in the light transmitting region of the photomask (12), while in the non-light transmitting regions (90) the photoresist persists without degradation. A positive photoresist developer (100) is then applied which removes the degraded portion of the positive photoresist (80). When the cutting means (70), (typically irradiation with ions, plasma or electrons) is applied, the pattern layer is again cut in the form of a pattern that will enable molding of an apparatus of this invention containing fibrils in the desired size and shape.

In another embodiment, this method makes use of projection lithography with a negative resist (refer to FIG. 5) or a positive resist (refer to FIG. 6) but where the photomask is no longer in contact or proximity to the photoresist layer. Exposure of the photomask to light in a projection lithography stepper or an immersion projection lithography stepper results in crosslinking of the negative resist or degradation of the positive photoresist material in the exposed regions. A photoresist developer is then applied which degrades the uncrosslinked portion of the negative photoresist, or removes the degraded regions of the positive photoresist. When the cutting means, (typically irradiation with ions, plasma or electrons) is applied, the pattern layer is cut into the desired form.

In another embodiment, the method makes use of a positive or negative resist, the method proceeds as in the negative resist case, except no photomask is necessary to produce the spatially varying latent image in the photoresist. Instead an interference photolithography stepper operating at any lithography wavelength is used, and the optical interference of two beams of light produces the spatially varying intensity of light in the photoresist layer, to produce the latent image. The positive or negative resist is then developed. Referring to FIG. 5 or 6, when the cutting means (70), (typically irradiation with ions, plasma or electrons) is applied the mold layer (40) is cut.

In another embodiment the method make use of nanoimprint lithography of the thermal type to produce a replica of the master mask pattern into a thermally deformable polymer layer. The mask is then removed and the polymeric replica of the master mask is used as the pattern transfer layer for the cutting process. Referring to FIG. 5 or 6, when the cutting means (70), (typically irradiation with ions, plasma or electrons) is applied the mold layer is cut.

In another embodiment the method makes use of nanoimprint lithography of the photosensitive type, typically referred to as step and flash nanoimprint lithography, to produce a replica of the master mask pattern. In this case the master mask pattern is brought into contact with a thermally deformable polymer layer. The mask is then removed and the polymeric replica of the master mask is used as the pattern transfer layer for the cutting process. Referring to FIG. 5 or 6, when the cutting means (70), (typically irradiation with ions, plasma or electrons) is applied the mold layer is cut.

This method of fabrication is a patterning system based on a method that employs standard photoresist technology coupled with ion irradiation for the cutting process. The pattern layer is then covered with a photoresist polymer, onto which a photomask is applied. For proximity or contact photolithography, or for projection lithography the photomask pattern is projected into the photoresist layer. When the resist is exposed to light through the photomask and developed, it is altered in a pattern corresponding to the photomask. The photoresist image is then developed using, typically, an aqueous base such as 0.26 Normal tetramethylammonium hydroxide (TMAH) and the soluble photoresist rinsed away. Other solvents useful for developing and removing resists include but are not limited to dimethyl acetamide NMP, ethanol, butanol, and THF.

The exposed mold layer is then irradiated with a source of ions, through the photomask with a specific pattern, and cutting of the mold layer takes place. In this fashion, a master mold is obtained from which an apparatus having fibrils of the size and shape as described herein can be produced.

Negative or positive resist materials comprise two families of photoactive or radiation-sensitive material. Negative resists become less soluble after exposure to radiation, and thus the unexposed areas can be removed by treatment with an appropriate solvent or developer. Positive resists, on the other hand, increase in solubility upon exposure, enabling the exposed regions to be removed in the solvent or developers.

The areas of resist that remain following the imaging and development processes are used to mask the underlying substrate for subsequent etching or other image-transfer steps. If, for example, the underlying substrate or base were $SiO_2$, immersion of the structure into an etchant such as buffered hydrofluoric acid would result in selective etching of the SiO2 in those areas that were bared during the development step. Resist material can be classified as positive or negative on the basis of their radiation response (Thompson et al., *Introduction to Microlithography*, American Professional Reference Book, pages 14-15 and 155-156, American Chemical Society, Washington, D.C., (1994)).

Cutting is accomplished by the utilization of ionized radiation including but not limited to photon irradiation utilizing ionized radiation such as ultraviolet rays, X-rays, electron irradiation, ion-beam irradiation, plasma ionization, and neutral atoms machining. Specifically, deep-UV rays having a wavelength of 254 to 120 nm, an excimer laser, especially ArF excimer laser (193 nm), $F_2$ excimer laser (157 nm), $Kr_2$ excimer laser (146 nm), KrAr excimer laser (134 nm) or Ar excimer laser (121 nm), x-rays, or an electron beam are particularly useful.

Subsequently, the latent pattern on the photoresist is etched out to remove those sections of the mold layer that are not protected by the photoresist. Following the etching process, the resist is removed for example, by stripping, hydrolysis, dissolution, or reaction. Developers useful in the present invention may include for example, aqueous alkali solution, such as 0.1 to 5%, and preferably 2 to 3%, tetramethylammonium hydroxide (TMAH). Developers may be applied by a conventional method such as dipping, puddling, or spraying for a period of 10 seconds to 3 minutes, and preferably 30 seconds to 2 minutes.

A variety of lithographic methods that provide for a cutting or etching process in accordance with a patterning system is suitable for use herein, including but not limited to contact photolithography, proximity photolithography, projection photolithography, interference photolithography, immersion projection photolithography, immersion interference photolithography, nanoimprint of thermal type, nanoimprint of optical type (step and flash) and soft lithography.

The resist composition may be applied by spin coating or the like to form a resist film which is then pre-baked on a hot plate at 60° C. to 200° C. for 10 seconds to 10 minutes, and preferably at 80° C. to 150° C. for ½ to 5 minutes. In the contact, proximity or projection lithography approach a patterning mask having the desired pattern may then be placed over the resist film and the film exposed through the mask to an electron beam or to high-energy radiation having a wavelength below 300 nm such as deep-UV rays, excimer laser light, or x-rays in a dose of about 1 to 200 $mJ/cm^2$, and preferably about 10 to 100 $mJ/cm^2$, then post-exposure baked (PEB) on a hot plate at 60° C. to 150° C. for 10 seconds to 5 minutes, and preferably at 80° C. to 130° C. for ½ to 3 minutes. Finally, development may be carried out using a developer such as TMAH.

After the master mold has been prepared by cutting the mold layer as described above, the mold is applied to the material from which the apparatus will be made. For this purpose, the material will be in a moldable condition, such as in a melted, viscous or flowable condition. The material is allowed to harden or cure in the mold, and the mold is removed to yield the apparatus, which will contain fibrils in the size and shape, and having the dimensions and properties, as described herein. A mold providing the close tolerances at the micron and sub-micron level needed to produce the apparatus of this invention is available using the photolithographic methods described above.

In an alternative embodiment, the resist layer need not be removed, and the relief pattern obtained from the image placed on the resist layer may be used as the mold.

An apparatus of this invention may be fabricated in the form of any type of sealing or fastening device such as a fastener for apparel, for luggage, or for a shoe.

The following non-limiting examples are meant to illustrate the invention but are not intended to limit it in any way.

EXAMPLE 1

A 0.030 inch thick sheet prepared from Butacite® plasticized polyvinyl butyral is cut into a specimen 140 mm wide by 200 mm long. Fibrils are cut using a knife in a 40 mm-long region, each fibril being 1 mm wide×14 mm long.

Figure 7:
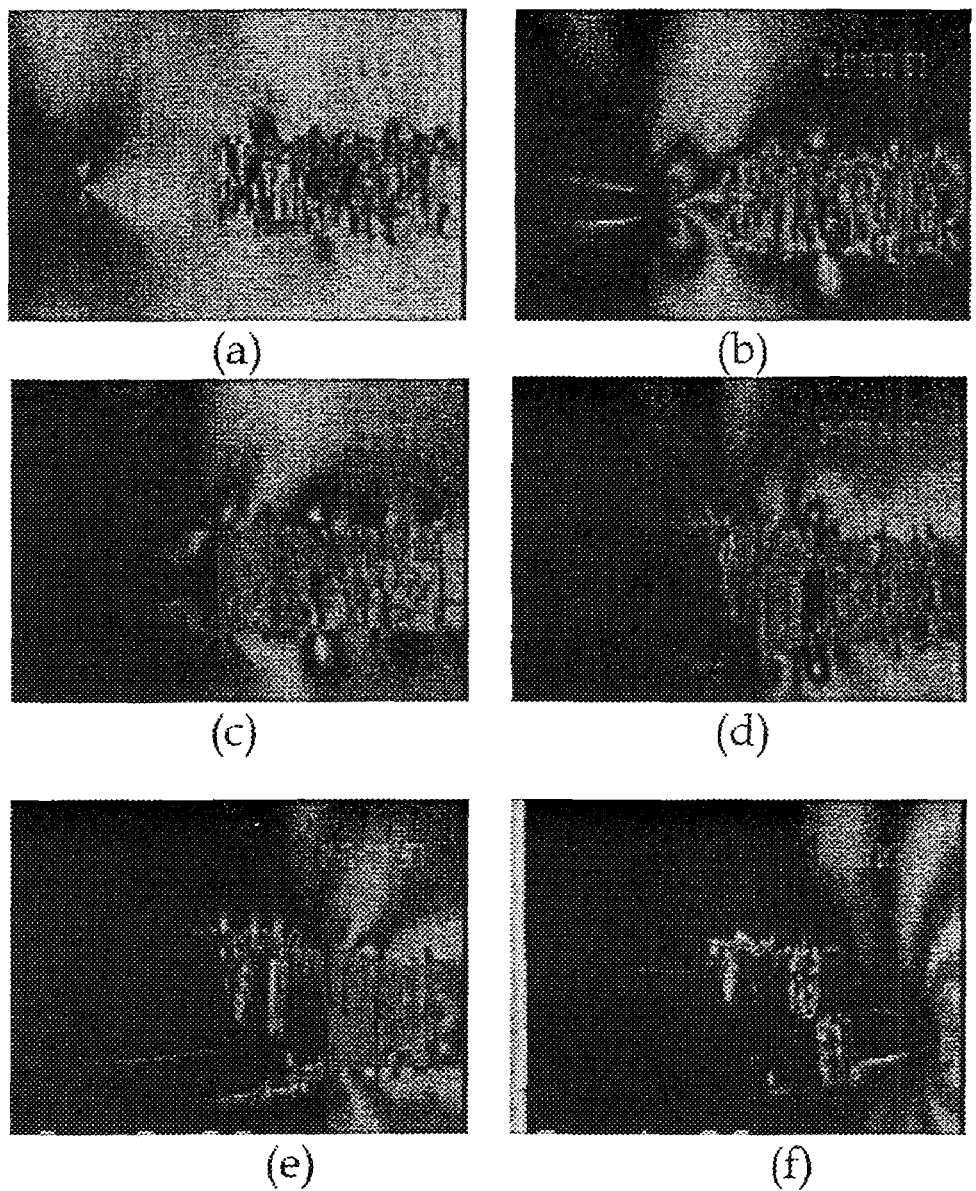
FIG. 7 illustrates Example 1.

An initial crack about 25 mm in length is cut as seen in frame (a) of FIG. 7. The specimen is loaded vertically in tension and viewed under white light through cross-polarizers. This reveals and visualizes regions of shear strain via the photoelasticity of the material.

Growth of the pre-crack is initiated in frame (a) and advances towards the fibrillar region in frame (b). Crack motion accelerates between frames (a) and (b), as expected, because external load and crack length are increasing, and, consequently, so is the crack tip stress intensity factor. The crack is arrested by the fibrillar region in frame (c). Subsequent advance through the fibrillar region is much slower, despite the monotonically increasing remote displacement. In particular, note in frames (d) and (e) that the unloaded fibrils do not easily transfer their energy to neighboring regions— that portion of the stored elastic energy is apparently lost. In frame (f), the crack reaches the end of the fibrillar region and again moves much more rapidly. This shows that the intentional introduction of a fibrillar region in the path of a crack increases the effective resistance to fracture.

EXAMPLE 2

Figure 8:
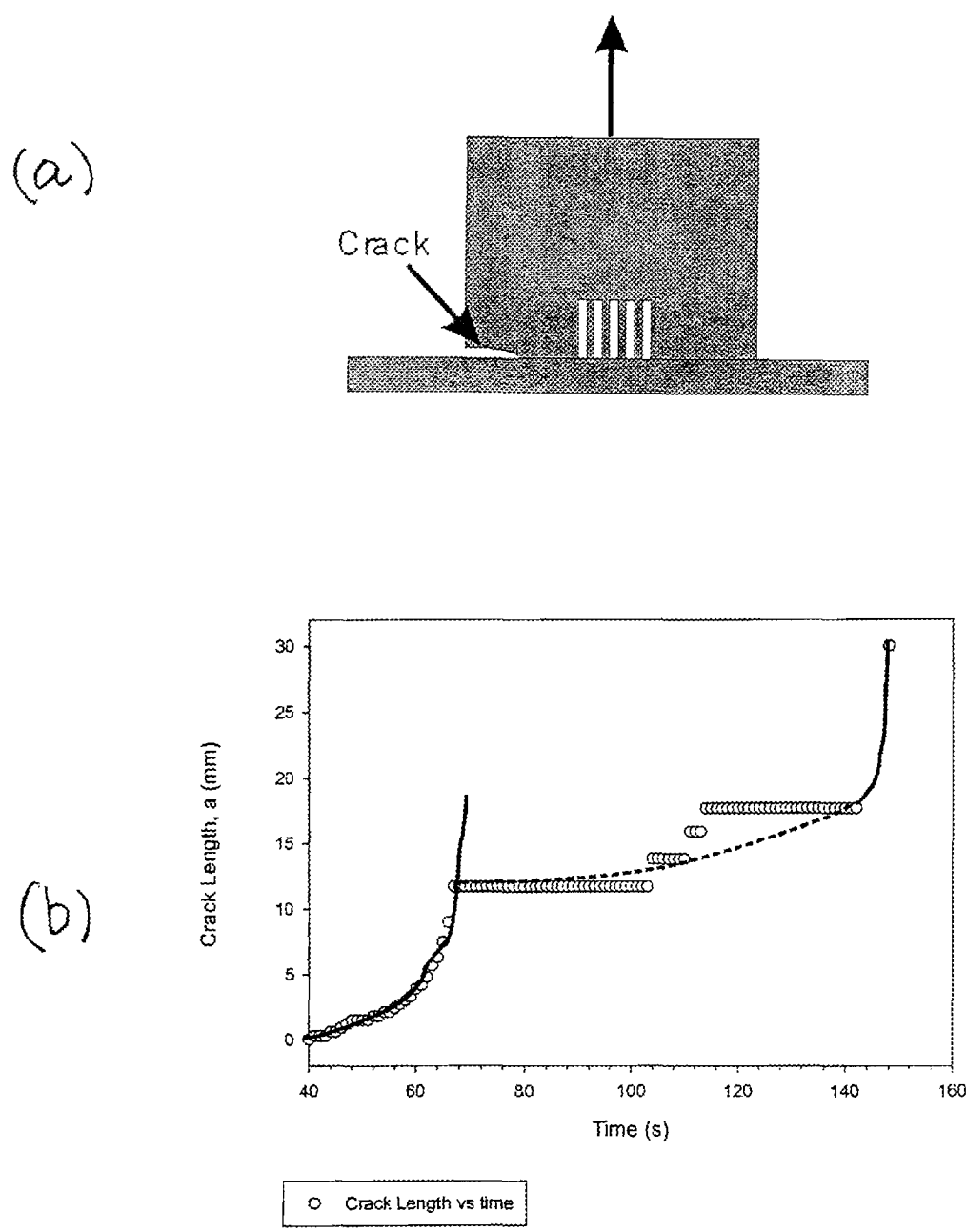
FIG. 8 illustrates Example 2.

Example 2 involves the use of a sheet prepared as in Example 1. A strip as shown in FIG. 8(*a*) is adhered to a glass slide by heating. The strip has a region with intentionally created fibrils. The sheet is pulled in tension and the force is measured. Simultaneously the crack is imaged through a microscope. FIG. 8(*b*) shows crack length as a function of time. The crack accelerates in the region with no fibrils as load and crack length increase (solid line). When it reaches the fibrillar region, the crack is arrested and then proceeds to advance much more slowly. At the end of the fibrillar region the crack advances rapidly again. This shows that the introduction of fibrils strongly enhances adhesion.

EXAMPLE 3

Photolithographic masters were fabricated with four isolated regions (5×5 mm) containing rectangular relief patterns of differing scales. Each roof has a rectangular cross section and a width (2a) of 5, 10, 20 or 50 microns. The structures are 19 times as long as wide and their height h is dictated by the thickness of the photoresist layer, in this case 30 microns. Within the pattern the roofs were separated by a distance 2a=2w.

Stamps were constructed from Sylgard 184 polydimethyl siloxane polymer in a ratio of 10:1 (rubber base:cure) and cured at a temperature of 50° C. for 48 hours prior to use. The silicone mixture was outgassed under vacuum for 30 minutes before applying to the master. During the curing period, the polymer was confined by a fluoropolymer O ring between the master surface and a glass plate under a load of several hundred grams. In this manner, excellent uniformity in stamp thickness (about 5 mm) could be achieved. Each relief pattern on the stamp was carefully cored with a cork borer to give a right cylinder about 3.5 mm in diameter and 5 mm in height.

The stamp segment was then placed in inverted position on a glass slide and viewed with an inverted microscope. With coaxial illumination, the regions of the stamp making contact with the glass are readily observed. A second piece of glass slightly larger than the sample was placed on top of it. Load was supplied by an 8.3 mm spherical glass rod attached to a load cell. Displacement was monitored via an LVDT (linear variable differential transformer). Load-displacement curves were acquired at various strain rates with the visual information captured by a video recorder and, at intervals, a 3 megapixel digital camera. In separate experiments, the moduli and stress relaxation behavior of stamps were determined by impinging the featureless area of the stamps with an 8.3 mm glass rod (without the intervening glass plate).

Figure 9:
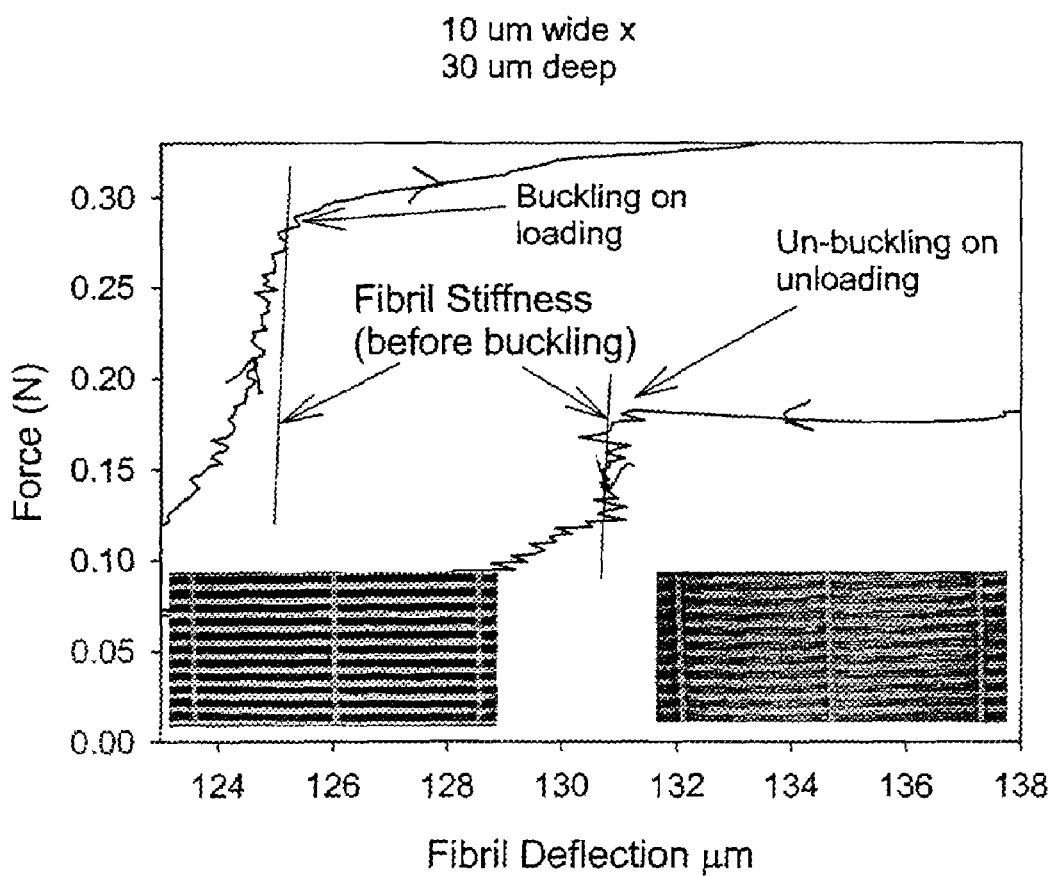
FIG. 9 illustrates Example 3.

In FIG. 9, in the unbuckled state, the fibrils making contact with the glass are visible as the dark regions in the optical micrograph on the left (each bar is 10 microns wide). After buckling, the contrast is much lower, as shown by the optical micrograph on the right, as the buckled fibrils bend away from the contact plane, making contact only along a line.

The graphed lines in FIG. 9 show the extracted force-deflection where only the fiber deflection is shown. Compression of the fibrils requires greater force until the fibrils buckle. Buckling, by contrast, results in much less stiff force-deflection response of the fibrillar mat, the desired characteristic for conforming to rough surfaces. Correspondingly, on unloading, the fibrils do not show much change in force with deflection until they are unbuckled.

EXAMPLE 4

Contact deformation of a polydimethyl siloxane stamp as prepared in Example 3 was conducted to study adhesion and effective modulus of the fibrillar material compared to a flat control. Indentation is with an 8.1 mm diameter glass sphere. FIG. 10(a) contains an image of fibrillar stamp indented by a sphere where w=10 microns. FIG. 10(b) shows that, at a critical load, fibrils in the region in the middle under higher compressive stress buckle.

Figure 11:
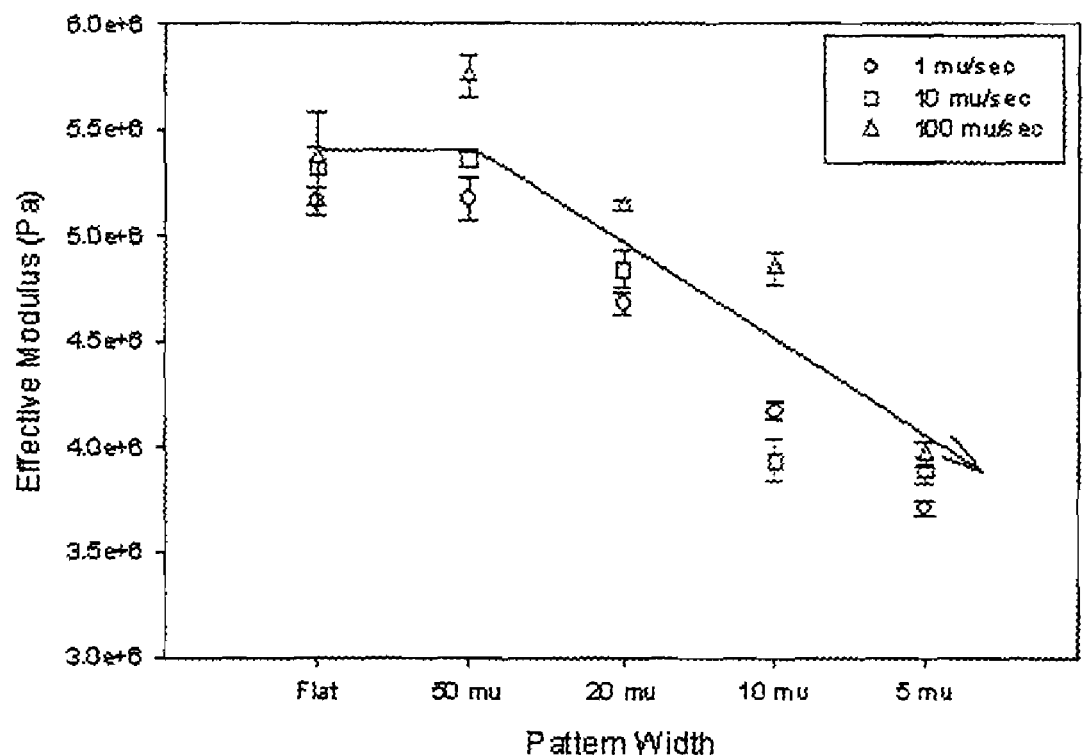
FIG. 11 illustrates Example 4.

Modulus and adhesion are extracted by application of Johnson-Kendall-Roberts theory ["JKR test", as set forth in K. L. Johnson, K. Kendall and A. D. Roberts, *Surface Energy and the Contact of Elastic Solids*, Proc. R. Soc. Lond. A 1971, 324, 301-313 (which is incorporated as a part hereof for all purposes)]. As seen in FIG. 11, modulus measurement shows a systematic decrease with higher aspect ratio fibrils. Thus the material can more easily conform to rough surfaces.

EXAMPLE 5

Figure 12:
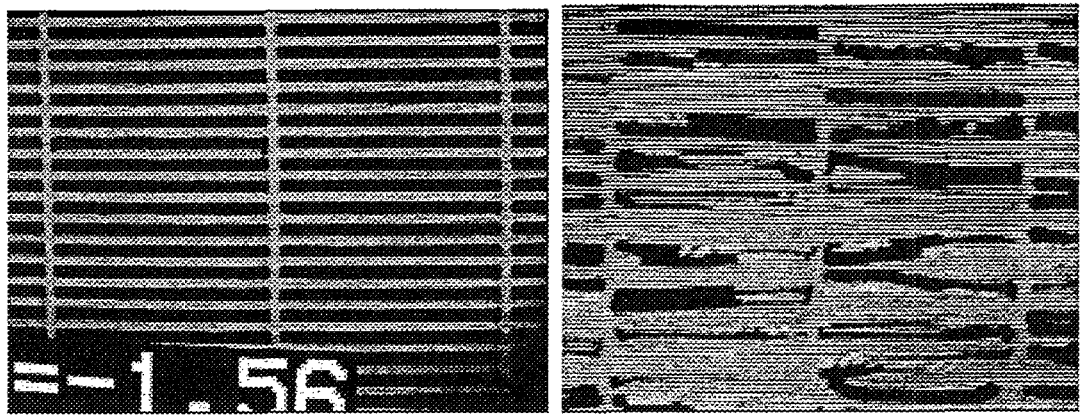
FIG. 12 illustrates Example 5.

Stamps were prepared from the same material as described in Example 3, both stamps being 30 microns deep. FIG. 12(a) shows a first stamp for which the width (2a) and spacing (2w) are both 10 microns. At a length (L) of 30 microns, the first stamp does not suffer lateral collapse, and would moreover need to exceed 47 microns before suffering lateral collapse.

FIG. 12(b) shows a second stamp for which the width (2a) and spacing (2w) are both 5 microns. At a length (L) of 30 microns, the second stamp suffers copious lateral collapse, and would moreover suffer lateral collapse at any length in excess of 19.8 microns. This demonstrates the importance of spacing fibrils in such manner as necessary, in view of their dimensions, to reduce or avoid lateral collapse. The spacing regime of this invention, as described above, achieves the necessary spacing to reduce or avoid lateral collapse.

The invention claimed is:

1. A dry fibrillar microstructure that adheres to and is reapplicable to a surface, and that comprises (a) a substrate, and (b) a plurality of fibrils attached to the substrate,
    wherein the minimum distance between the surface of a first fibril and the surface of a second adjacent fibril, at the plane of attachment of the fibrils to the substrate, is a distance 2w where w is determined from Equation IV;
    wherein each of the first and second fibrils has a neutral axis, passing through the centroid of the cross-sectional area of the fibril, that has an orientation with the plane of the substrate, at the point of intersection of the axis with the plane of the substrate, in the range of greater than 75° to about 90°;
    wherein Equation IV is $$w > (g^2 * L^2/4a) * (2\gamma/3Ea)^{1/2};\text{ and}$$

wherein E is the Young's modulus of the material of the first or second fibril as determined by ASTM D412-87, a is one-half of the characteristic width of the first or second fibril, L is the length of the first or second fibril, γ is the surface energy of the material of the first or second fibril as determined by ASTM D724-99, g is a dimensionless constant having a value in the range of about 0.05 to about 5.0, and * indicates multiplication.

2. A fibrillar microstructure according to claim 1 wherein E is the Young's modulus of the material of the first fibril, a is one-half of the characteristic width of the first fibril, L is the length of the first fibril, and γ is the surface energy of the material of the first fibril.

3. A fibrillar microstructure according to claim 1 wherein E is the Young's modulus of the material of the second fibril, a is one-half of the characteristic width of the second fibril, L is the length of the second fibril, and γ is the surface energy of the material of the second fibril.

4. A fibrillar microstructure according to claim 1 wherein each of the first and second fibrils has a neutral axis, passing through the centroid of the cross-sectional area of the fibril, that has an orientation with the plane of the substrate, at the point of intersection of the axis with the plane of the substrate, in the range of about 80° to about 90°.

5. A fibrillar microstructure according to claim 1 wherein 2w is in the range of about 4 nanometers to about 50 microns.

6. A fibrillar microstructure according to claim 1 wherein about 25 percent of the fibrils are a first fibril wherein the minimum distance between the surface of the first fibril and the surface of a second adjacent fibril, at the plane of attachment of the fibrils to the substrate, is a distance 2w.

7. A fibrillar microstructure according to claim 1 wherein E is in the range of about $10^5$ to about $2 \times 10^{12}$ Pa.

8. A fibrillar microstructure according to claim 1 wherein a is in the range of about 2 nanometers to about 25 microns.

9. A fibrillar microstructure according to claim 1 wherein L is in the range of about 50 nanometers to about 1000 microns.

10. A fibrillar microstructure according to claim 1 wherein γ is in the range of about 0.01 J/m2 to about 2.0 J/m².

11. A fibrillar microstructure according to claim 1 fabricated in the form of a sealing or fastening device.

12. A dry fibrillar microstructure that adheres to and is reapplicable to a surfaces and that comprises (a) a substrate, and (b) a plurality of fibrils attached to the substrate, wherein one or more of the fibrils (c) are characterized by a value of a, one-half of the characteristic width of the fibril, determined from Equation VI, and (d) has a neutral axis, passing through the centroid of the cross-sectional area of the fibril, that has an orientation with the plane of the substrate, at the point of intersection of the axis with the plane of the substrate, in the range of greater than 75° to about 90°;

wherein Equation VI is $a < d * \Gamma_0 * E / s^2$, wherein E is the Young's modulus of the material of the fibril as determined by ASTM D412-87, $\Gamma_0$ is interfacial fracture energy of the of the material of the fibril as determined by ASTM D3433-99, s is the interfacial strength of the material of the fibril as determined by ASTM D2094-69, d is a dimensionless constant having a value in the range of about 0.05 to about 5.0, and * indicates multiplication.

13. A fibrillar microstructure according to claim 12 wherein a has a value in the range of about 2 nanometers to about 25 microns.

14. A fibrillar microstructure according to claim 12 wherein each fibril characterized by a value of a as set forth by Equation VI has a neutral axis, passing through the centroid of the cross-sectional area of the fibril, that has an orientation with the plane of the substrate, at the point of intersection of the axis with the plane of the substrate, in the range of about 80° to about 90°.

15. A fibrillar microstructure according to claim 12 wherein at least about 25 percent of the fibrils are characterized by a value of a as set forth by Equation VI.

16. A fibrillar microstructure according to claim 12 wherein E is in the range of about $10^5$ to about $2 \times 10^{12}$ Pa.

17. A fibrillar microstructure according to claim 12 wherein L is in the range of about 50 nanometers to about 1000 microns.

18. A fibrillar microstructure according to claim 12 wherein s is in the range of about $10^5$ to about $10^9$ Pa.

19. A fibrillar microstructure according to claim 12 wherein $\Gamma_0$ is in the range of about 0.01 J/m² to about 1000.0 J/m².

20. A fibrillar microstructure according to claim 12 fabricated in the form of a sealing or fastening device.

21. A dry fibrillar microstructure that adheres to and is reapplicable to a surface, and that comprises (a) a substrate, and (b) a plurality of fibrils attached to the substrate, wherein one or more of the fibrils (c) adheres to the surface with a work of adhesion of $\Gamma$ in the range of about 0.1 J/m² to about $10^4$ J/m², where $\Gamma$ is determined according to Equation VII, and (d) has a neutral axis, passing through the centroid of the cross-sectional area of the fibril, that has an orientation with the plane of the substrate, at the point of intersection of the axis with the plane of the substrate, in the range of greater than 75° to about 90°;

wherein Equation VII is $\Gamma = \Gamma_0 + f * s^{2} * L / 2E$;

wherein $\Gamma_0$ is interfacial fracture energy of the of the material of the fibril as determined by ASTM D3433-99, s is the interfacial strength of the material of the fibril as determined by ASTM D2094-69, E is the Young's modulus of the material of the fibril as determined by ASTM D412-87, L is the length of the fibril, f is a dimensionless constant having a value in the range of about 0.01 to about 5.0, and * indicates multiplication.

22. A fibrillar microstructure according to claim 21 wherein each fibril characterized by a value of $\Gamma$ as set forth by Equation VII has a neutral axis, passing through the centroid of the cross-sectional area of the fibril, that has an orientation with the plane of the substrate, at the point of intersection of the axis with the plane of the substrate, in the range of about 80° to about 90°.

23. A fibrillar microstructure according to claim 21 wherein each fibril characterized by a value of $\Gamma$ as set forth by Equation VII has a characteristic width of 2a where a is has a value in the range of about 2 nanometers to about 25 microns.

24. A fibrillar microstructure according to claim 21 wherein at least about 25 percent of the fibrils are characterized by a value of $\Gamma$ as set forth by Equation VII.

25. A fibrillar microstructure according to claim 21 wherein E is in the range of about $10^5$ to about $2 \times 10^{12}$ Pa.

26. A fibrillar microstructure according to claim 21 wherein L is in the range of about 50 nanometers to about 1000 microns.

27. A fibrillar microstructure according to claim 21 wherein s is in the range of about $10^5$ to about $10^9$ Pa.

28. A fibrillar microstructure according to claim 21 wherein $\Gamma_0$ is in the range of about 0.01 J/m2 to about 1000.0 J/m².

29. A fibrillar microstructure according to claim 21 fabricated in the form of a sealing or fastening device.

* * * * *